(12) United States Patent
Reith et al.

(10) Patent No.: US 7,989,995 B2
(45) Date of Patent: Aug. 2, 2011

(54) CAP AND SEAL FOR WINDSHIELD WIPER DRIVE FOR VEHICLES

(75) Inventors: Michael Reith, Buehl-Vimbuch (DE); Orlando Gabriel De Dias, Karlsruhe (DE); Paul Geubel, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 12/307,148

(22) PCT Filed: Oct. 29, 2007

(86) PCT No.: PCT/EP2007/061612
§ 371 (c)(1),
(2), (4) Date: Dec. 31, 2008

(87) PCT Pub. No.: WO2008/080656
PCT Pub. Date: Jul. 10, 2008

(65) Prior Publication Data
US 2010/0001593 A1    Jan. 7, 2010

(30) Foreign Application Priority Data

Dec. 29, 2006  (DE) .......................... 10 2006 062 588

(51) Int. Cl.
*H02K 35/00* (2006.01)
*H02K 7/06* (2006.01)
*H02K 33/00* (2006.01)

(52) U.S. Cl. ............ 310/37; 310/36; 310/38; 310/75 R; 310/80; 310/85; 310/89; 180/53.8; 296/96.15; 15/250.001

(58) Field of Classification Search .................... 310/37, 310/36, 38, 75 R, 80, 85, 89; 180/53.8; 296/96.15
See application file for complete search history.

(56) References Cited

U.S. PATENT DOCUMENTS

| 2003/0213087 A1* | 11/2003 | Moein et al. ................... 310/89 |
| 2009/0094774 A1* | 4/2009 | Reith et al. ................ 15/250.31 |
| 2009/0272208 A1* | 11/2009 | Bohn et al. ....................... 74/47 |

FOREIGN PATENT DOCUMENTS

| DE | 19546906 A1 | 6/1997 |
| DE | 10331854 A1 * | 2/2005 |
| DE | 10343572 A1 | 4/2005 |
| EP | 1837256 A1 | 9/2007 |
| JP | 2000071941 A * | 3/2000 |
| WO | 2007080008 A1 | 7/2007 |

OTHER PUBLICATIONS

Machine translation of DE 10331854 A1, DE-10331854trans.pdf.*
Machine translation of JP 2000071941 A, JP-2000071941trans.pdf.*
PCT/EP2007/061612 International Search Report.

* cited by examiner

*Primary Examiner* — Quyen Leung
*Assistant Examiner* — Michael Andrews
(74) *Attorney, Agent, or Firm* — Michael Best & Friedrich LLP

(57) ABSTRACT

A windshield wiper drive (1) is provided for the output shaft (4) with a protective cap (15) across a longitudinal region. The protective cap (15) is supported between the terminal supports thereof against the drive shaft (4) and the drive housing (2) of the windshield wiper drive (1) in relation to the output shaft (4) via a supporting bearing (20).

18 Claims, 1 Drawing Sheet

CAP AND SEAL FOR WINDSHIELD WIPER DRIVE FOR VEHICLES

BACKGROUND AND SUMMARY OF THE INVENTION

The invention relates to a windshield wiper drive for vehicles, in particular for rear windshield wipers of vehicles.

Windshield wiper drives for vehicles are known from practice in embodiments in which the output shaft leading to the windshield wiper is supported in a drive housing, which is located behind a cover, for example also a windshield, which is penetrated by the output shaft. The output shaft is in this region enclosed by a protective cap, which is supported relative to the housing and which at the end remote from the housing sealingly bears against the output shaft.

The encompassing arrangement of the cover relative to the protective cap, due to tolerances of the vehicle and in the arrangement of the windshield wiper drive, may lead to loading of the protective cap which impairs the sealed connection of the protective cap relative to the output shaft, particularly during operation of the windshield wiper, and dynamic forces may occur, in particular in the return positions, which may also have a negative effect on the sealed connection of the protective cap relative to the output shaft.

The object of the invention is to prevent negative effects on the sealed connection of the protective cap relative to the output shaft, by such loads acting on the protective cap.

In the windshield wiper drive according to the invention, the protective cap is radially supported in the transition between its end regions, i.e. in the transition of its support relative to the drive housing and its sealed connection relative to the output shaft provided at the other end. This takes place, in particular, by bridging over the radial gap between the output shaft and the protective cap, via a support bearing supported against the output shaft, so that forces acting on the protective cap—in particular in the region of its penetration of a cover—may be absorbed by the support bearing and have no effect on the sealed connection of the protective cap relative to the output shaft.

The sealed connection of the protective cap relative to the output shaft is formed, in particular, by a sealed arrangement associated with the protective cap, preferably an annular seal, namely an O-ring.

The support of the annular seal takes place axially by a retaining element, in particular an annular retaining element, which is axially secured to the protective cap in a locking manner and in a tensioning manner.

The support bearing is preferably configured as a supporting sleeve and axially secured to the protective cap via an annular collar. This annular collar is expediently located between a spring-loaded shoulder of the protective cap and a latching shoulder which is associated with the protective cap and able to be passed over, and which may be designed as an inwardly curved bead, so that with a corresponding radial elasticity of the protective cap, consisting preferably of plastics, or of the annular collar, the fixing of the support bearing may be achieved without tools and without additional parts.

The support of the protective cap via the support bearing preferably takes place in a region of the protective cap, in which said protective cap is supported, in particular sealingly, against an encompassing component, whether a cover or a windshield.

If the windshield wiper drive according to the invention is used in combination with rear windshields of vehicles for rear windshield wipers, the drive housing is located inside the windshield and the windshield is penetrated by the output shaft, a preferably annular sealing element being arranged between the windshield and the protective cap and the entire arrangement possibly requiring long output shafts with a long overhang for support on the housing side, so that the partial stiffening of the protective cap according to the invention via the supporting sleeve is particularly advantageous.

BRIEF DESCRIPTION OF THE DRAWINGS

Further advantages and expedient embodiments may be derived from the claims, the description of the figures and the drawings, in which:

DETAILED DESCRIPTION

Figures 1, 2:
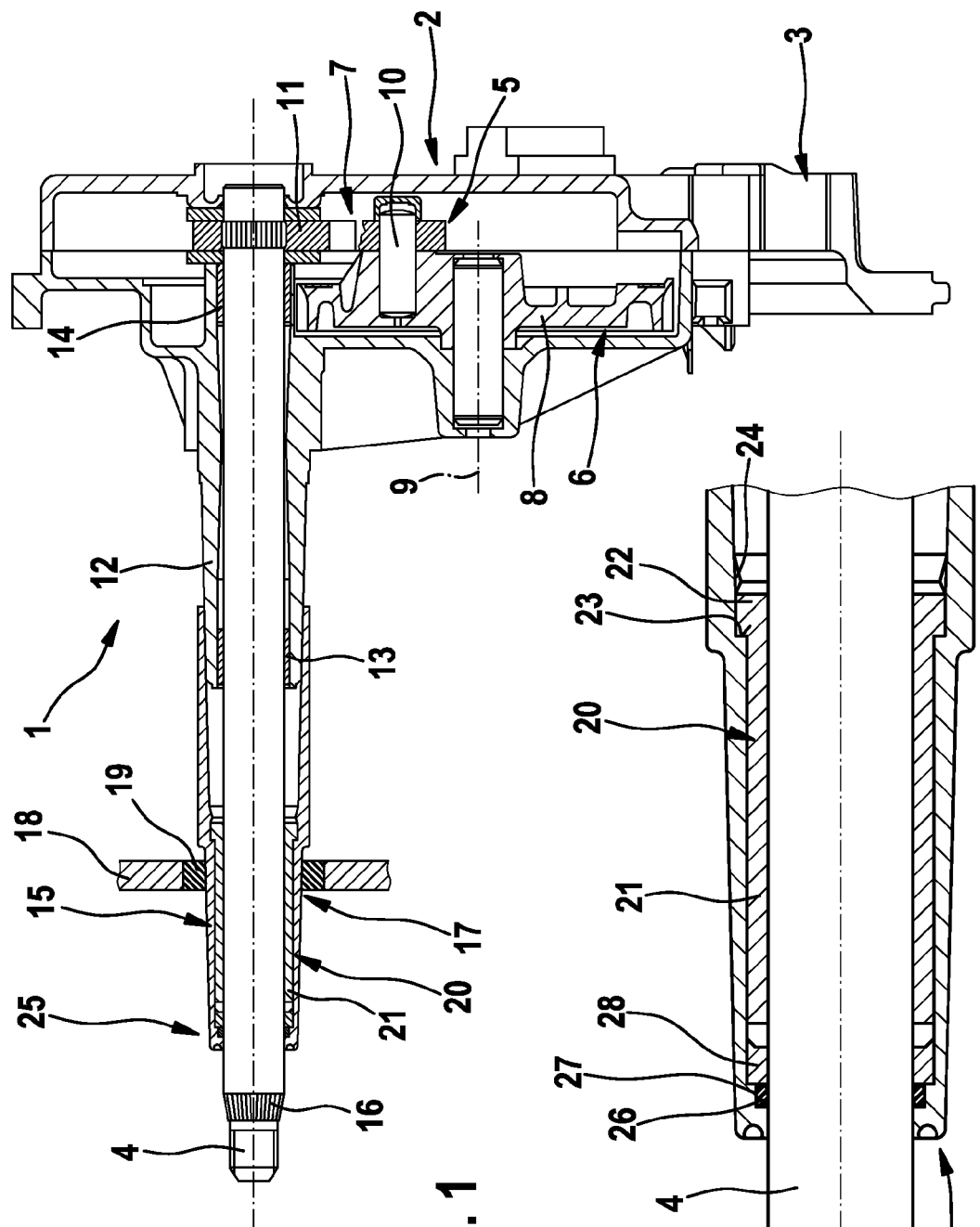
FIG. 1 shows in a sectional view parts of a windshield wiper drive comprising an output shaft.
FIG. 2 shows an enlarged view of a longitudinal region of the output shaft comprising an encompassing protective cap and radial support of the protective cap against the output shaft via a support bearing.

In FIG. 1, partially in section, a windshield wiper drive 1 for vehicles is shown. This is shown in an embodiment as is provided, in particular, in connection with windshield wiper arrangements for rear windshields of vehicles.

The windshield wiper drive 1 comprises a motor 3, only indicated, and a gear mechanism 5 located in the connection thereof to an output shaft 4, which comprises a worm drive 6 and a crank drive 7, which is connected to the output shaft 4. Of the worm drive 6, substantially only the worm wheel 8 mounted in the drive housing 2 is shown, which bears the crank pin 10 located axially offset to the worm wheel axis 9, starting from which the oscillating drive of a rocker 11 takes place which is arranged fixedly in terms of rotation relative to the output shaft 4.

The output shaft 4 is supported in an elongated neck 12 of the drive housing 2 at the opposing neck ends via bearings 13, 14, of which the bearing 14 on the housing side is arranged in the vicinity of the rocker 11 of the crank drive 7. The output shaft 4 projects beyond the bearing 13 arranged on the free end of the neck 12, and the part of the output shaft 4 projecting beyond the neck 12 is covered by an elongated protective cap 15 as far as in the vicinity of the end of the output shaft 4 which forms with its notched cone 16 a part of the terminal connection with a windshield wiper arm, not shown.

As shown in FIG. 1, in the embodiment shown the output shaft 4 penetrates a rear windshield of a vehicle indicated at 18, and the opening 17 receives a seal 19 encompassing the protective cap 15 and secured to the rear windshield 18, via which as an encompassing component, the rear windshield 18 is attached to the protective cap 15.

In this connecting region the elongated protective cap 15, sealingly bearing against the output shaft 4 with its end remote from the neck 12, is supported via a support bearing 20 radially against the output shaft 4. The support bearing 20 is preferably configured as a supporting sleeve 21 which, adjacent to its cylindrical sleeve part, has an annular collar 22 which is axially supported between a spring-loaded shoulder 23 of the protective cap 15 and a latching bead 24 which may be passed over by the annular collar 22, and thus secures the axial position of the support bearing 20 to the protective cap 15. At the same time, via the support bearing 20 and when the protective cap 15 is loaded, the protective cap 15 is prevented via the seal 19 and/or the rear windshield 18 from being subjected, in the region of its sealed connection relative to the output shaft 4, to deformations and/or loads which could impair the desired seal.

In the embodiment, the sealed connection 25 is achieved by a sealing element 26, in particular in the form of an O-ring, which is arranged in a recess in the annular region 27 enclosing the output shaft 4 radially adjacent to the output shaft 4 and is axially supported in the direction of the annular region 27 via a retaining element 28. The retaining element 28 is configured as an annular body, which has radial clearance relative to the output shaft 4, and is axially secured by latching or tensioning to the protective cap 15.

By means of the solution according to the invention, the protective function of the protective cap 15 may be ensured, even when long regions of the output shaft 4 are covered by the protective cap 15 in an encompassing manner and also when tolerances, relative movements and oscillations, as a result of the large projecting length of the output shaft 4, cause large deflections of the output shaft 4 and the protective cap 15 connected thereto.

The invention claimed is:

1. A windshield wiper drive (1) for vehicles, comprising an output shaft (4) supported relative to a drive housing (2), the output shaft penetrating a protective cap (15) which is supported relative to the drive housing (2) and which has an end that is remote from the drive housing (2) and that sealingly bears against the output shaft (4), characterized in that the protective cap (15) is radially supported between its support relative to the drive housing (2) and its sealed connection (25) relative to the output shaft (4) via a support bearing (20); and in that the support bearing (20) is formed by a supporting sleeve (21), the supporting sleeve (21) having an axially-extending sleeve portion with a sleeve outer surface and an annular collar (22) projecting radially beyond the sleeve portion and with a collar outer surface, the sleeve outer surface and the collar outer surface engaging an inner surface of the protective cap (15);

characterized in that the protective cap (15) in the region radially adjacent to the support bearing (20) is supported against an encompassing component relative to the protective cap (15).

2. The windshield wiper drive as claimed in claim 1, characterized in that the protective cap (15) is radially inwardly supported via the support bearing (20) on the output shaft (4).

3. The windshield wiper drive as claimed in claim 1, characterized in that the protective cap (15) is supported relative to the drive housing (2) on a housing neck (12) penetrated by the output shaft (4).

4. The windshield wiper drive as claimed in claim 1, characterized in that the support bearing (20) is axially secured by the protective cap (15).

5. The windshield wiper drive as claimed in claim 4, characterized in that the annular collar (22) is axially secured by the protective cap (15).

6. The windshield wiper drive as claimed in claim 5, characterized in that the annular collar (22) is secured between a shoulder (23) and a latching bead (24) of the protective cap (15).

7. The windshield wiper drive as claimed in claim 1, characterized in that one of a cover and a windshield, in particular rear windshield (18), is provided as an encompassing component.

8. The windshield wiper drive as claimed in claim 1, characterized in that a seal (19) located between the rear windshield (18) and the protective cap (15) is provided as an encompassing component.

9. The windshield wiper drive as claimed in claim 2, characterized in that the protective cap (15) is supported relative to the drive housing (2) on a housing neck (12) penetrated by the output shaft (4).

10. The windshield wiper drive as claimed in claim 9, characterized in that the support bearing (20) is axially secured by the protective cap (15).

11. The windshield wiper drive as claimed in claim 10, characterized in that the annular collar (22) is axially secured by the protective cap (15).

12. The windshield wiper drive as claimed in claim 11, characterized in that the annular collar (22) is secured between a shoulder (23) and a latching bead (24) of the protective cap (15).

13. The windshield wiper drive as claimed in claim 12, characterized in that one of a cover and a windshield, in particular rear windshield (18), is provided as an encompassing component.

14. The windshield wiper drive as claimed in claim 12, characterized in that a seal (19) located between the rear windshield (18) and the protective cap (15) is provided as an encompassing component.

15. A windshield wiper drive (1) for vehicles, comprising an output shaft (4) supported relative to a drive housing (2), the output shaft penetrating a protective cap (15) which is supported relative to the drive housing (2) and which has an end that is remote from the drive housing (2) and that sealingly bears against the output shaft (4), characterized in that the protective cap (15) is radially supported between its support relative to the drive housing (2) and its sealed connection (25) relative to the output shaft (4) via a support bearing (20) and characterized in that the protective cap (15), in the region radially adjacent to the support bearing (20), is supported against an encompassing component relative to the protective cap (15).

16. The windshield wiper drive as claimed in claim 15, characterized in that the support bearing (20) is axially secured by the protective cap (15).

17. The windshield wiper drive as claimed in claim 15, characterized in that the support bearing (20) is formed by an axially-extending supporting sleeve (21), the supporting sleeve (21) having an axially-extending sleeve portion and an annular collar (22) projecting radially beyond the sleeve portion.

18. The windshield wiper drive as claimed in claim 17, characterized in that the annular collar (22) axially secured by the protective cap (15) between a shoulder (23) and a latching bead (24) of the protective cap (15).

* * * * *